INVENTORS
GAYLORD W. BROWN
ROBERT T. JOHNSON
BY ELWYN JONES

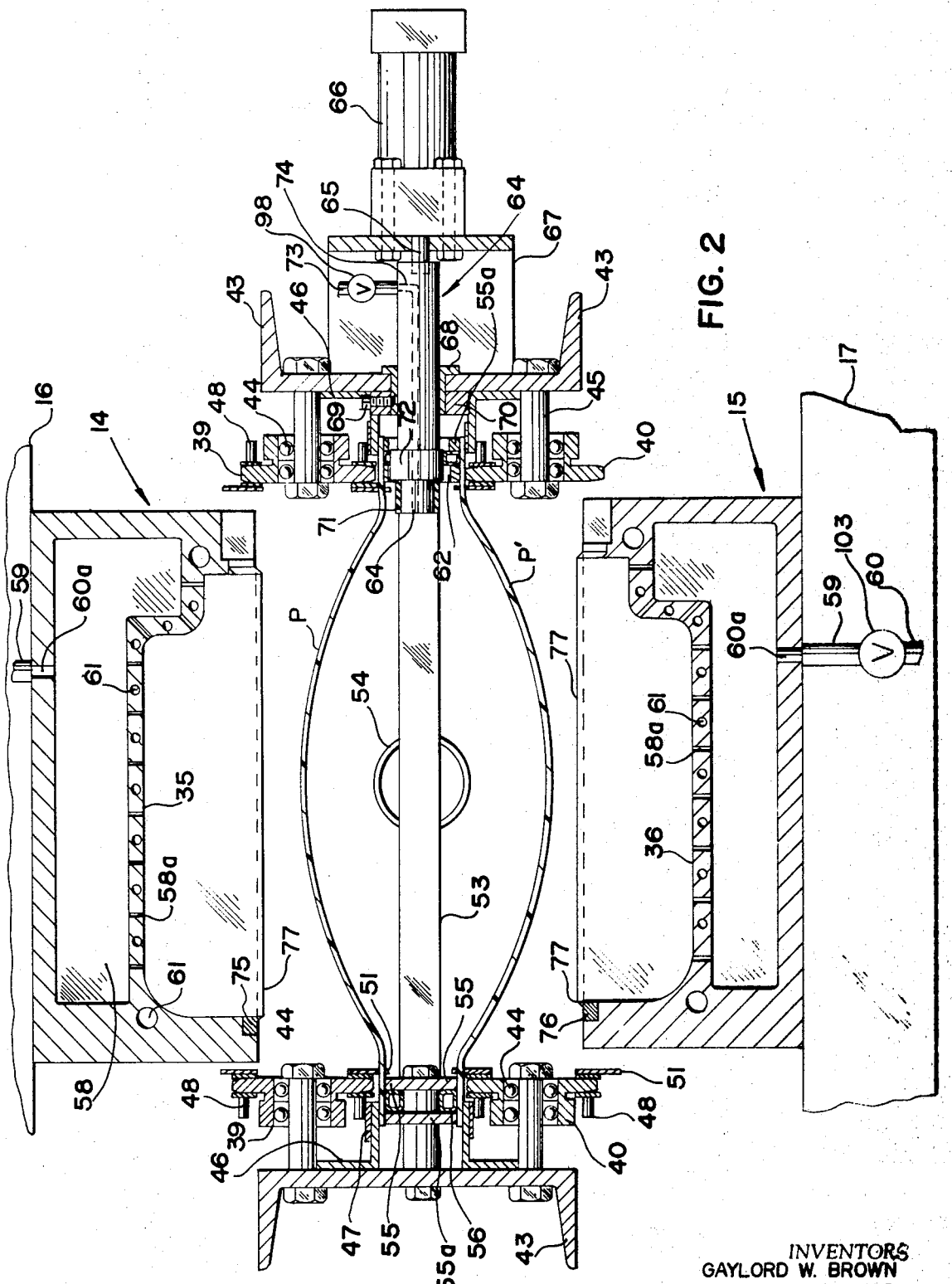

INVENTORS
GAYLORD W. BROWN
ROBERT T. JOHNSON
ELWYN JONES
BY
Learman & McCulloch
Attorneys

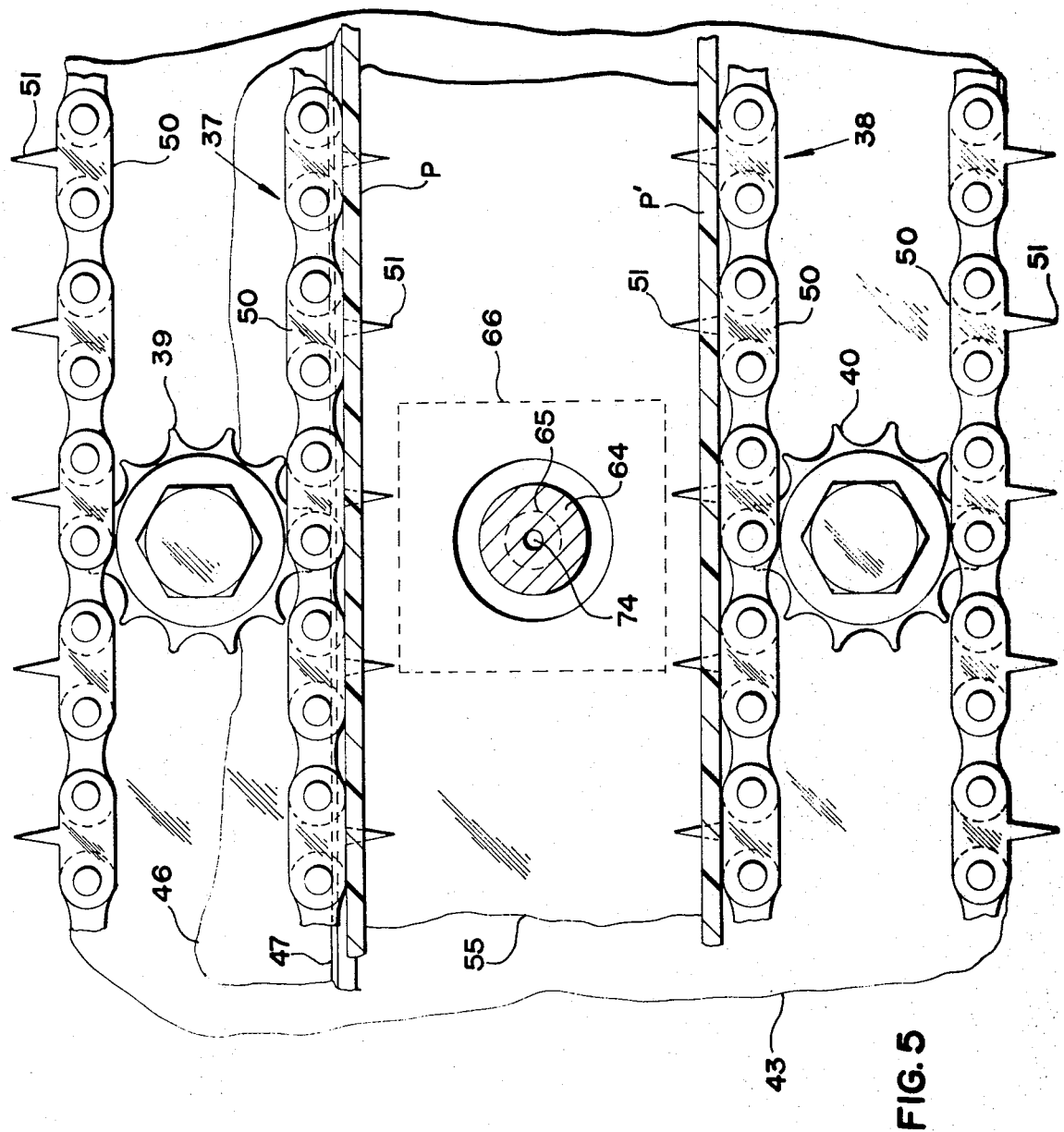
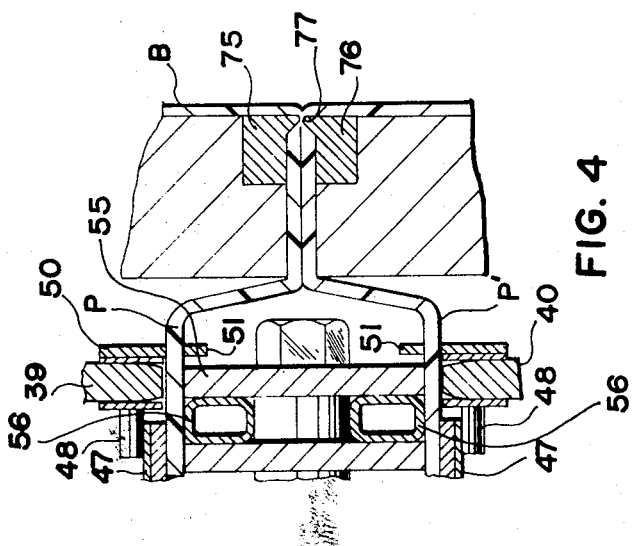
FIG. 5
FIG. 4
INVENTORS
GAYLORD W. BROWN
ROBERT T. JOHNSON
BY  ELWYN JONES
Learman & McCulloch
Attorneys INVENTORS
GAYLORD W. BROWN
ROBERT T. JOHNSON
ELWYN JONES
BY
Learman & McCulloch
Attorneys

United States Patent Office 3,537,138
Patented Nov. 3, 1970

3,537,138
APPARATUS AND METHOD FOR FORMING ARTICLES IN A PAIR OF INCREMENTALLY ADVANCED THERMOPLASTIC WEBS
Gaylord W. Brown, Robert T. Johnson, and Elwyn Jones, Beaverton, Mich., assignors to Brown Machine Company of Michigan, Inc., Beaverton, Mich., a corporation of Michigan.
Filed July 2, 1968, Ser. No. 742,066
Int. Cl. B29c 17/00
U.S. Cl. 18—19                               22 Claims

ABSTRACT OF THE DISCLOSURE

Apparatus for forming containers and like hollow articles in a pair of heat fusible, formable thermoplastic sheets wherein the sheets are incrementally advanced through a pair of molds which close to heat fuse the sheets and differential pressure form the articles therein. A thermally elevated air stream is utilized to maintain the heated and sagging sheets apart until the molds are closed and differential pressure conditions are introduced to form the containers.

---

One of the prime objects of the invention is to provide apparatus of the character described wherein an advancing chain assembly is employed to move the pair of heated plastic webs to and through container forming molds so that relatively high rates of production may be achieved.

Another object of the invention is to provide dual sheet forming apparatus to replace parison forming blow molding techniques and permit articles such as milk bottles and jugs with small diameter necks to be differential pressure formed on a production basis in separable mold halves mounted on reciprocable platens.

Still another object of the invention is to provide reliable and economic two sheet forming apparatus of an improved character wherein both pressure and suction forces may be utilized in forming and wherein a separation of the heated and sagging sheets is maintained by a heated air stream which also aids in maintaining the sheets at the forming temperature desired at the mold.

Other objects and advantages of the invention will be pointed out specifically or will become apparent from the following description when it is considered in conjunction with the appended claims and the accompanying drawings, in which:

FIG. 2 is an enlarged, transverse sectional view with the molds shown in separated relationship;

FIG. 4 is an additionally enlarge, fragmentary, transverse sectional view illustrating the plastic web squeezing rings provided in the molds;

FIG. 5 is a fragmentary, side elevational view showing a blow pin reciprocably mounted in one of the chain-supporting guide rails;

Figure 1:
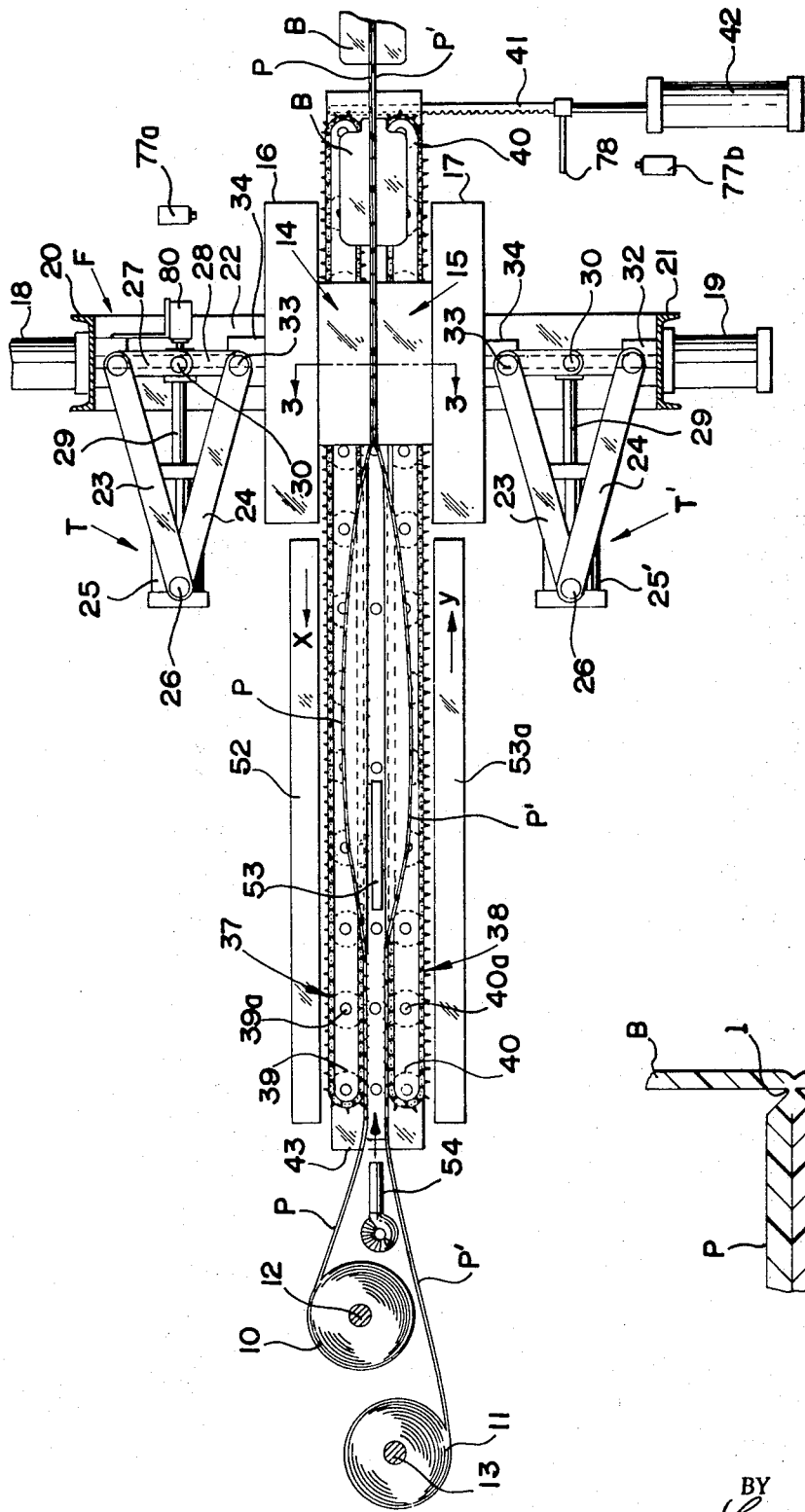
FIG. 1 is a partly sectional, schematic, side elevational view illustrating the manner in which a pair of plastic webs are fed to the machine and joined by the molds.

Referring now more particularly to the accompanying drawings and, in the first instance, particularly to FIG. 1, we have shown a pair of plastic sheets or webs P and P' being drawn from supply rolls 10 and 11, respectively, which are, in the usual manner, journaled on shafts 12 and 13. The plastic webs or strips P and P' may be any plastics which are conventionally thermoformed, such as polyethylene, polypropylene, and polystyrene, and, while we have shown the webs P and P' as being drawn from supply rolls 10 and 11, it is to be understood that extruders may be employed to directly supply the webs or sheets at elevated temperatures, if desired. The molds, generally designated 14 and 15, which are employed to join the plastic webs P and P' and form articles such as containers therein are mounted on vertically reciprocable platens 16 and 17, fluid pressure operated cylinders or rams 18 and 19 being employed in the usual manner to move the platens 16 and 17 vertically in properly timed relation. The frame F of the machine includes the upper and lower support rails 20 and 21 on which the cylinders 18 and 19 are mounted, and side guide rails 22 for the platens 16 and 17. Upper and lower locking toggle mechanisms generally designated T and T', respectively, are employed in the usual manner to lock the platens 16 and 17 in closed position and comprise pairs of elongate links 23 and 24, each of which are pivotally connected at one end to the upper fluid pressure operated cylinder 25 or lower fluid pressure operated cylinder 25', as at 26, and pairs of links 27 and 28, which are each pivotally connected to the piston rod 29 of cylinder 25 or cylinder 25', as at 30. The links 23 and 27 are pivotally mounted on pins 31 extending from support blocks 32 on the upper and lower frame members 20 and 21, and the links 24 and 28 are pivotally mounted on pins 33 extending on support blocks 24 provided on each of the platens 16 and 17. The toggle structures operate in the manner disclosed in the present assignee's Brown and Rise United States Pat. No. 3,346,923, issued Oct. 17, 1967, the cylinders 25 and 25' being operated in each instance after the platen 16 or 17 has been moved to closed position to expand the links 27 and 28 and lock the molds 14 and 15 in closed position in the manner described in the aforementioned patent. As FIG. 3 indicates, the molds 14 and 15 are provided with mold cavities 35 and 36, respectively, which form the bottles or jugs B, shown at the right of molds 14 and 15 in FIG. 1 in the joined plastic webs P and P'.

To move the plastic webs P and P' in increments to and through the molds 14 and 15 when the molds 14 and 15 are in separated position, side chain assemblies with pairs of superposed endless roller chains generally designated 37 and 38 are provided. As shown in FIG. 1, the chains 37 and 38 are each trained around a series or row of longitudinally arranged sprockets 39 and 40, respectively. The chains 37 and 38 may be advanced incrementally by a rack 41 operated by the fluid pressure cylinder 42 shown in FIG. 1. Mechanism for driving such chains in incremental advancing movements is disclosed in the previously mentioned United States patent and is more particularly disclosed in Brown and Rise United States Pat. No. 3,217,852, issued Nov. 16, 1965, and both are incorporated by reference herein. It is to be understood that the rack 41 may be employed to drive the lower sprocket 40 at the right end of the machine in FIG. 1 and that suitable gearing may then be employed to drive the superjacent end sprocket 39 from the end sprocket 40 so that the chains move simultaneously in the direction of arrows x and y in FIG. 1. The end sprocket shafts 39a and 40a may extend from one side of the machine to the other to mount sprockets on both sides of the machine.

The remaining sprockets 39 and 40 are supported from the frame side rails 43 on roller bearings 44 mounted on stub shafts 45. Angle members 46 secured to and extending along the frame side rails 43 are provided with wear strips 47, forming guide surfaces for pins 48 which extend from the roller chain links 49 on one side of each of the chains. A chain of this construction is shown in the present assignee's copending United States application Ser. No. 584,436. Special links 50 are provided for the chains 37 and 38, which have prongs or pins 51 to pierce the plastic webs P and P', as illustrated particularly in FIG. 5.

Mounted above and below the chains 37 and 38, upstream of the molds 14 and 15, are heater housing 52, 53 and 53a, having electrical resistance heaters, which may be of the Calrod variety, for bringing the plastic sheets P and P' to forming temperatures. Typically, for polystrene such temperatures will be 280° F., for example, and for polyethylene about 350° F. When the plastic sheets reach these temperatures, they become soft and will sag in the middle. The sagging effect is enhanced by the sharp accelerations and decelerations of the advancing chains 37 and 38, which at the high speeds of operation of the machine move the sheets forwardly at a rapidly accelerated and then rapidly decelerated speed. To ensure that the sheets P and P' will not come together before they are, in fact, pressed together by the molds 14 and 15, a stream of warm air at substantially the forming temperature of the particular plastic webs P and P' is blown between the sheets P and P' by a continuously operated blower 54 which, as FIGS. 1 and 2 clearly indicate, billows the plastic sheets P and P' and prevents them from anywhere coming into engagement prior to the time the molds 14 and 15 are closed. The blower 54 may comprise a fan incorporating suitable electrical resistance heating elements. It will be noted that the sprockets 39 and 40 along each side of the machine are provided in spaced apart relation on opposite sides of a guide bar 55 which extends coextensively with the chains 37 and 38 and which cooperates with the also coextensively extending angle bars 46 to support and guide the side edges of the plastic sheets P and P', as illustrated particularly in FIGS. 2 and 3. The guide bars 55 may be cooled by tubes 56 which extend between the bars 55 and coextensive backer bars 55a and through which a suitable coolant such as water at about 50° F. is circulated continuously.

Figure 3:
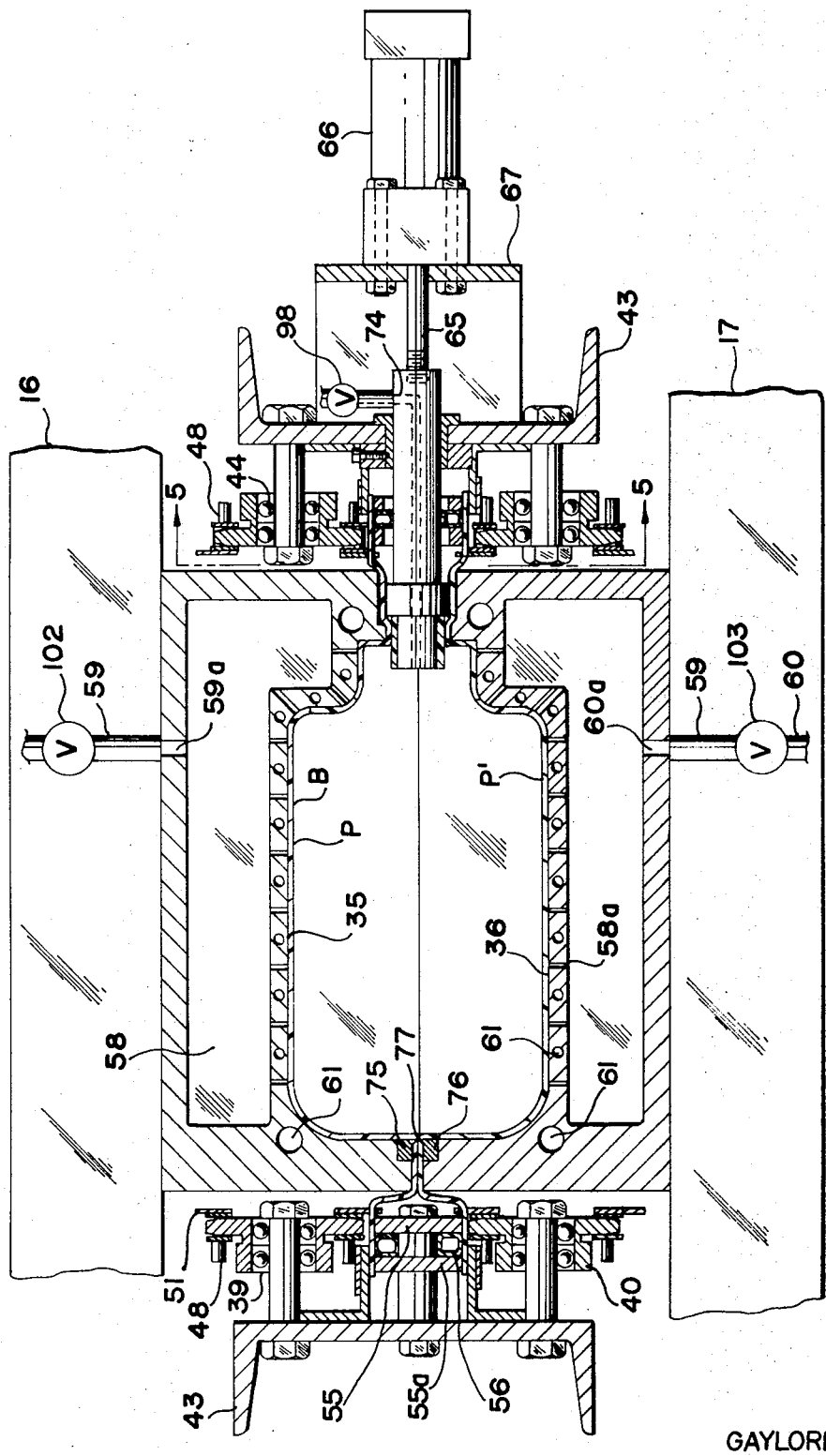
FIG. 3 is a similar transverse sectional view taken on the line 3—3 of FIG. 1 and showing the molds in closed position.

As FIG. 3 indicates, each of the molds 14 and 15 includes a vacuum manifold or chamber 58 communicating with the mold cavity 35 or 36 by means of vacuum ports 58a, there being flexible vacuum tubes 59 and 60 leading from vacuum ports 59a and 60a, respectively, and moving with the molds 14 and 15. The tubes 59 and 60 connect to a suitable source of vacuum, such as a vacuum pump. The molds 14 and 15 are preferably cooled molds which may, for example, be cooled by coolant-containing tubes or pipes 61 which are connected to a suitable source of circulating coolant, such as shown in the Gaylord W. Brown United States Pat. No. 2,994,514.

Provided in the guide rail 55 and back plate 55a on one side of the machine are openings 62 and 63, respectively (see FIG. 2), to admit a blow tube generally designated 64 which is reciprocable from the withdrawn position shown in FIG. 2 to the extended position shown in FIG. 3. The blow tube is connected to the piston rod 65 to a fluid pressure operated cylinder 66 which is supported on a bracket 67 connected to the one side rail 43, and is received for sliding movement by a bushing 68 secured by a pin 69 extending through a lock collar 70. At its front end a suitably heat resistant rubber extension member 71 is secured to the blow tube 64 by a collar 72. The rubber sleeve provides a deformable surface to which the plastic webs P and P' can seal when they are pressed down around the sleeve 71 upon closing of the molds 14 and 15, as shown in FIG. 3. A flexible air line 73 connects with the through port 74 provided in the blow tube 64 to supply forming air under pressure at the proper time, after molds 14 and 15 have closed.

Figure 6:
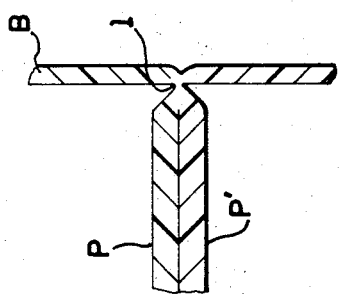
FIG. 6 is an enlarged fragmentary view illustrating the reduced thickness parting line which is formed between the formed article and the remainder of the web in which it is formed to facilitate easy separation of the article from the web.

Provided in the mold sections 14 and 15, around the periphery thereof, are squeezing rings 75 and 76, respectively, which have pinching protrusions 77, as shown in FIG. 4 particularly. As FIG. 6 indicates, when the molds are brought together the projection 77 do not quite sever the heat fused plastic webs P and P'. Rather, they, in effect, weld them together in a thickness which may be only 5 to 8 thousandths of an inch to form a parting or juncture line $l$ so that the bottles B can later readily be separated from the joined web portions P and P'.

Figure 7:
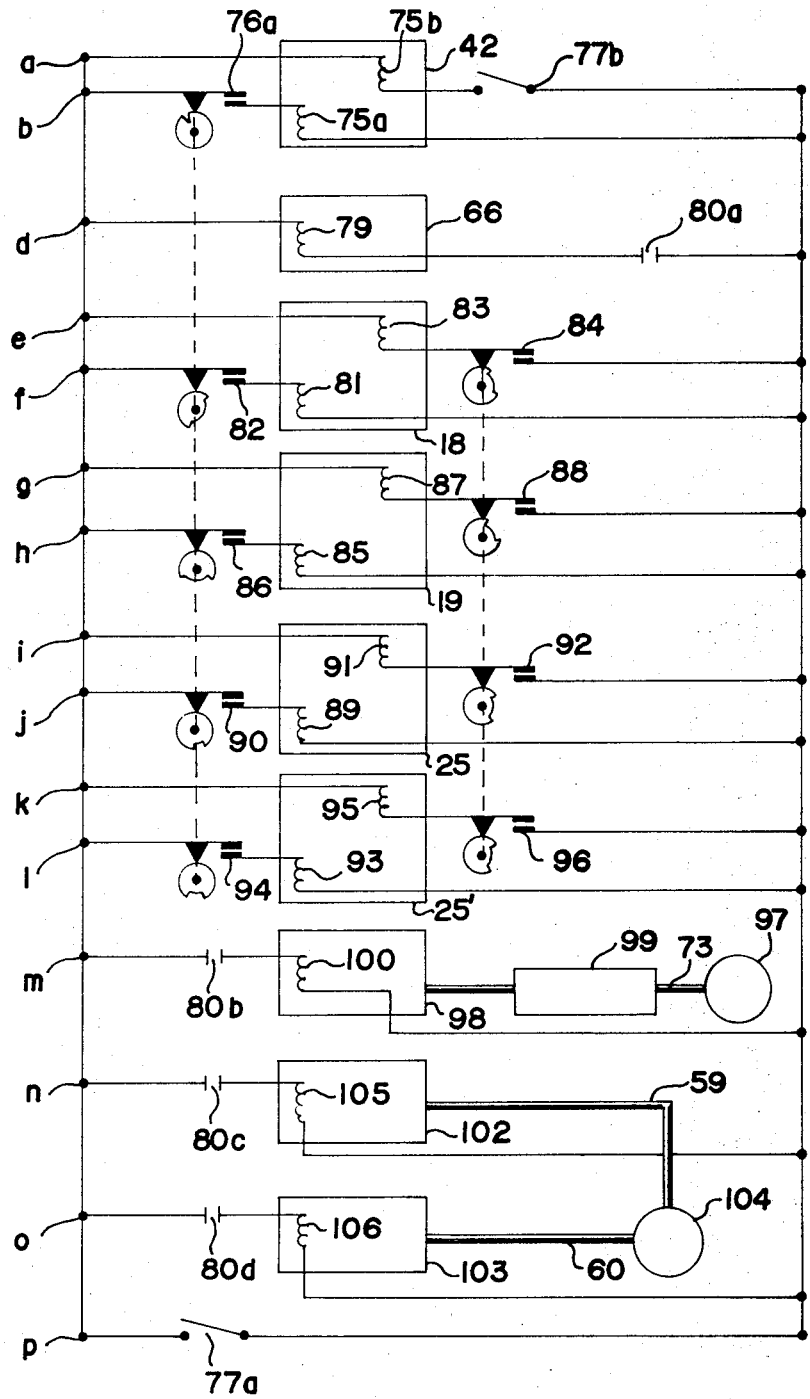
FIG. 7 is a typical schematic electrical control circuit which may be employed.

In FIG. 7 we have shown a schematic representation of an electrical control circuit which may be employed to control the various operating elements of the machine and operate them in proper sequence. It is to be understood that the diagram shown is intended to be representative only and that various control systems could be employed to operate the various elements in timed relation. In the diagram the chain-advancing cylinder 42 is shown as including a sheet advancing rack retracting solenoid 75a in a circuit line $b$ in series with a cam controlled limit switch 76a. It is to be understood that limit switch 76a and a number of other limit switches which will be mentioned are actuated by cams on a timing shaft which may be revolved continuously or may be started by an actuating limit switch, as desired, to commence a cycle. In the present instance, it will be assumed that the timing shaft is driven by a motor which is started when a limit switch 77a in a circuit line $p$ is operated by the upper platen 16 returning to its uppermost position. Such units are commercially available and one such unit is well known as the Gemco unit. The piston rod of the chain advance cylinder 42 is immediately returned without moving the sheets P and P' by a rack advancing solenoid 75b which is energized by the limit switch 77b in circuit line $a$ when the actuator bar 78 on rack 41 reaches its lowermost position. Because the rack bar 41 operates through a fluid pressure operated clutch in the manner illustrated in the aforementioned United States Pat. No. 3,217,852, the return or "up" stroke of the rack 41 does not operate to retract the advancing chains 37 and 38.

The blow tube advancing cylinder 66 may be a single-acting, spring returned air cylinder which normally holds the blow tube 64 in retracted position and is advanced only when its advance solenoid 79 is energized. The solenoid 79 is in a circuit line $d$ in series with the normally open terminals 80a of limit switch 80 which, as FIG. 1 indicates, is closed when the toggle links 27 and 28 of the uper toggle mechanism T are expanded to the position in which they are shown in FIG. 1. The upper platen actuating cylinder 18 is operated by an advance solenoid 81 in a circuit line $f$ which is energized when a cam controlled switch 32 is closed to lower the platen 16. The platen 16 is raised when a retract solenoid 83 in circuit line $e$ is energized upon closing of the normally open cam operated switch 84 in circuit line $e$. Similarly, the lower platen is raised when an advance solenoid 85 in a circuit line $h$ is energized by a normally open, cam-operated switch 86 and lowered or retracted when a retract solenoid 87 in a circuit line $g$ is closed by normally open, cam-operated switch 88 in circuit line $g$.

The upper toggle-operating cylinder 25 is advanced to lock the toggle mechanism T when an advancing solenoid 89 in a circuit line $j$ is closed by a normally open cam-operated switch 90 operated by the upper platen 16 reaching its lower closed position, and is unlocked when a retract solenoid 91 in a circuit line $i$ is closed by a normally open, cam-operated switch 92 in the circuit line $i$. Similarly, the lower toggle mechanism T' is locked when an advance solenoid 93 in a circuit line $l$ is closed, when cam-operated switch 94 is actuated upon the lower platen 17 reaching its raised or closed position, and is unlocked when a retract solenoid 95 in a circuit line $k$ is energized when a normally open, cam-operated switch 96 in circuit line $k$ is closed.

Air pressure from a compressor 97 may be supplied to the normally closed, openable air valve 98 in line 73 via an accumulator tank 99. The single-acting, spring returned air valve 98 is opened to supply a jet of air under pressure to the passage 74 when an advance solenoid 100 in a circuit line $m$ is energized upon closing of the limit switch 80, shown in FIG. 1, which also has normally open terminals 80b, 80c and 80d, shown in circuit lines $m$, $n$ and $o$, respectively. Similarly, operated, normally closed, spring returned valves 102 and 103 are provided for vacuum lines 59 and 60, respectively, which may be selectively communicated with a vacuum pump 104. The normally closed, spring returned valves 102 and 103 are operated simultaneously with the normally closed spring returned valve 98 by advance solenoids 105 and 106 in circuit lines $n$ and $o$, respectively, in series with the normally open contacts 80c and 80d, which are closed when the switch 80 is operated upon expansion of toggle linkage T.

In operation, the cycle is commenced when switch 77a (FIG. 1) is closed upon the upper platen 16 returning to its uppermost position at the end of the previous cycle, inasmuch as the closing of switch 77a operates to revolve the timing cam shaft on which the cams operating switches 76a, 82, 84, 86, 88, 92, and 96 are mounted. First of all, switch 76a is closed to energize advance solenoid 75a and move the rack 41 in an "up" stroke to advance the sheets P and P' an increment, which will be a length slightly longer than the length of the molds 14 and 15 shown in FIG. 1. Once the sheets P and P' have been simultaneously advanced, the cam-operated switch 86 is closed to energize the advance solenoid 85 of lower platen-operating cylinder 19 and the lower mold 15 is raised to engage the lower plastic web P'. When the platen 17 reaches raised position, the cam-operated switch 94 is closed to energize the advance solenoid 93 of the lower toggle mechanism operating cylinder 25' and the lower toggle mechanism T' is expanded to lock the platen 17 and mold 15 in raised position.

The cam-operated switch 82 is then closed to energize the advance solenoid 81 of the upper platen operating cylinder 18, which moves the mold 14 to a lowered position in engagement with the upper plastic strip P. Upon the upper platen 16 reaching lowered position, the cam-operated switch 90 is closed and the advance solenoid 89 of the upper toggle mechanism operating cylinder 25 is energized to expand the upper toggle mechanism T and lock the upper platen 16 and upper mold 14 in lowered position. At this time, the portions of webs P and P' surrounding cavities 35 and 36 have been heat fused together and squeezing ring portions 77 have substantially severed the webs P and P' at the periphery of the mold along the parting or juncture line $l$, the squeezing rings 75 and 76 being broken only by an opening which admits the blow tube 64. The pressure of the air stream introduced by blower fan 54 between molds 14 and 15 keeps the sagging webs P and P' apart and, when molds 14 and 15 are closed, part of this stream is entrapped and causes the portions of the webs P and P' adjacent the cavities 35 and 36 to move into the cavities.

Once the sheets P and P' have been engaged and welded together by the squeezing action of the molds 14 and 15, the forming air is admitted to the passage 74 in the blow tube 64 by valve 98, and the vacuum lines 59 and 60 are simultaneously communicated with the vacuum pump 104. The valves 98, 102 and 103 are simultaneously operated when the limit switch 80 (see FIG. 1) is closed upon expansion of the upper toggle mechanism T. The bottle B is formed virtually instantaneously by the cooperative pressure differential created by air pressure and vacuum forces on opposite sides of the sheets P and P'.

The forming air introduced through the blow tube 64 at room temperature not only aids in the forming operation but also operates to cool the portions of the plastic webs P and P', which are formed in the shape of the mold cavities 35 and 36, to the point that the portions will hold shape when the molds 14 and 15 are removed. The upper toggle mechanism T and lower toggle mechanism T' may be simultaneously released once forming and cooling has taken place, and this occurs when the switches 92 and 96 are closed to energize retract solenoids 91 and 95 operating cylinders 25 and 25', respectively. Upon release of the toggle mechanisms T and T', the upper and lower platens 16 and 17 may be simultaneously separated upon the simultaneous closing of switches 84 and 88 energizing the retract solenoids 83 and 87 which respectively operate the upper and lower platen cylinders 18 and 19. Of course, then with closing of switch 77a by the upper platen 16, a new cycle is commenced.

It is to be understood that the machine operates rapidly and about only five seconds, for example, may be required to complete each cycle.

It is to be understood that the drawings and descriptive matter are in al cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. Apparatus for differential pressure forming hollow plastic containers and the like with a pair of deformable thermoplastic sheets comprising: a pair of relatively movable mold members, both having a mold cavity and movable toward and away from one another to closed and open positions respectively; pairs of parallelly extending spaced apart sheet gripping members for gripping the opposite edges of the sheets movable in a direction generally toward said mold members for advancing the pair of sheets between said mold members; guide means extending between each pair of sheet gripping members for holding the edges of said sheets in separated position to be moved along by said sheet gripping members; means for moving said mold members to closed position to clamp said sheets between them and heat fuse sheet portions around said cavities; and means for applying a differential pressure to said mold members to form portions of said sheets to the shape of said cavities.

2. The combination defined in claim 1 in which said sheet gripping members comprise laterally spaced apart pairs of superposed endless chains carrying sheet piercing members thereon; and said guide means comprises a stationary guide rail means extending coextensively between each pair of chains.

3. The combination defined in claim 1 in which heating means extends above and below the path of said sheets upstream of said mold members for heating the sheets to a deformable temperature.

4. The combination defined in claim 1 in which means directs a stream of heated air between said sheets.

5. The combination defined in claim 3 in which fan means is provided for moving an air stream between said sheets to billow the heated sheets and maintain them separated until clamped between said mold members.

6. The combination defined in claim 1 in which said means for applying a differential pressure includes a reciprocable air injection member.

7. The combination defined in claim 6 in which said air injection member extends through said guide means in at least one position thereof and motor means is provided for moving it laterally to and fro.

8. The combination defined in claim 7 in which said air injection member comprises a resilient, deformable sleeve around which said plastic webs are pressed to seal thereto when the mold members are moved to closed position.

9. The combination defined in claim 6 in which air under pressure is fed through said injection member and said cavities are communicated with a vacuum source only after said mold members are closed.

10. The combination defined in claim 2 in which said guide rail means each includes a pair of laterally spaced rails with coolant tubes between and engaging them.

11. The combination defined in claim 2 in which a resilient deformable air injecting hollow member extends laterally from said guide rail means between said sheets and projects a substantial distance laterally beyond said piercing members.

12. The combination defined in claim 11 in which locking element mechanism is operated to lock said mold members in closed position once said mold members are moved to closed position; and means operated responsive to locking of said mechanism imparts air under pressure through said air injecting member.

13. Apparatus for differential pressure forming hollow plastic containers and the like with a pair of deformable thermoplastic sheets comprising: a pair of relatively movable mold members, both having a mold cavity and movable toward and away from one another to closed and open positions respectively; means for supporting a pair of sheets by their edge portion between said mold members; means for moving said mold members to closed position to clamp said sheets between them and heat fuse portions of the sheets around said cavities; means for introducing a heated fluid under pressure between said sheets before said mold members are closed to maintain the mid portions of the sheets separated; and means for applying a differential pressure to said mold members to form portions of said sheets to the shape of said cavities.

14. The combination defined in claim 13 in which said means for supporting said pair of sheets by their edge portions comprises sheet gripping and advancing assemblies providing closed side walls forming an open ended channel leading to said mold members; and means continuously introduces heated air in a continuous stream flowing down said channel toward mold members.

15. Apparatus for differential pressure forming hollow plastic containers and the like with a pair of deformable thermoplastic sheets comprising: a pair of relatively movable female mold members having cavities movable toward and away from one another to closed and open positions respectively; means for advancing said pair of sheets between said mold members; means for moving said mold members to closed position to clamp said sheets between them and heat fuse portions thereof around said cavities; resilient sleeve means projecting between said sheets to a position between said mold members; and around which said sheets seal when said mold members are closed; and means for applying a fluid under pressure through said sleeve means after said mold members are closed to form portions of said sheets to the shape of said cavities.

16. The combination defined in claim 15 in which said advancing means comprise laterally spaced apart pairs of superposed endless chains carrying sheet piercing members thereon; and guide means comprising a stationary guide rail extends coextensively between each pair of chains; said sleeve extending through an opening on one of said guide rails.

17. The apparatus defined in claim 16 in which motor means moves said sleeve laterally inwardly before said mold members are closed and outwardly when the mold members are moved to open position.

18. Apparatus for differential pressure forming hollow plastic containers and the like with a pair of deformable thermoplastic sheets comprising: a pair of relatively movable female mold members with complementary mold cavities movable toward and away from one another to closed and open positions respectively; means for advancing said pair of sheets between said mold members; means for moving said mold members to closed position to clamp said sheets between them and heat fuse portions thereof around said cavities; squeezing ring means having a projecting edge carried by at least one of said mold members for creating a parting line around the mold cavities of substantially reduced thickness relative to the thickness of the sheets; and means for applying a differential pressure to said mold members to form portions of said sheets to the shape of said cavities.

19. The combination defined in claim 17 in which pairs of advancing chains separated by guide rails move the sheets simultaneously in indexed movements between periods of dwell to and between said mold members and said squeezing ring means comprises a projecting knife edge carried by each mold member which is shaped to the complementary mold cavities.

20. Apparatus for differential pressure forming hollow plastic containers and the like in a pair of deformable thermoplastic sheets comprising: a pair of relatively movable mold members with mold activities movable toward and away from one another to closed and open positions respectively; generally parallelly extending spaced apart advancing members having portions extending on opposite side of said mold members and movable in a direction generally toward said mold members for advancing a pair of sheets between said mold members; guide means extending between said advancing members for holding the edges of said sheets in separated position to be moved along by said advancing members; heater means supported substantially at this level of said guide means between said sheets upstream of said mold members; means for moving said mold members to closed position to clamp said sheets between them and heat fuse the portions thereby around said cavities; and means for applying a differential pressure to said mold members to form said sheets to the shape of said cavities.

21. The combination defined in claim 20 in which heating means also extends above and below the path of said sheets upstream of said mold members for aiding in heating the sheets to a deformable temperature.

22. The combination defined in claim 20 in which means is provided for directing a flow of air toward said heater means between the sheets.

References Cited

UNITED STATES PATENTS

| | | | |
|---|---|---|---|
| 3,142,089 | 7/1964 | Wilkalis et al. | 18—5 |
| 3,346,923 | 10/1967 | Brown et al. | 18—19 |
| 3,412,430 | 11/1968 | Zwiebel | 18—19 |

H. A. KILBY, Jr., Primary Examiner

U.S. Cl. X.R.

18—5